Patented June 25, 1929.

1,718,370

UNITED STATES PATENT OFFICE.

JOSEPH D. McNUTT, OF NEW HAVEN, CONNECTICUT, ASSIGNOR, BY MESNE ASSIGNMENTS, TO WINCHESTER REPEATING ARMS COMPANY, A CORPORATION OF DELAWARE.

NONCORROSIVE PRIMING MIXTURE.

No Drawing. Application filed July 13, 1927. Serial No. 205,528.

My invention relates to an improvement in priming mixtures, the object being to produce a priming mixture of such a character that it will leave no corrosive residuum.

With these ends in view, my invention consists in a priming mixture characterized by the employment, as its chief oxygen-supplying element, of a metallic dioxid; as its principal fuel element, a metallic silicid; and as its detonating element, a metallic fulminate.

In carrying out my invention, I preferably employ, dependent upon the commercial strength of the ingredients, substantially 30-45% mercury fulminate (dry weight),
25-45% barium dioxid,
10-25% calcium silicid,
0-25% ground glass, though these proportions may be varied as may be necessary to meet the requirements of various uses of the ultimate mixture.

In proceeding to make my improved priming mixture, the dioxid, silicid and ground glass (if used) are weighed out, sifted and mixed dry. A small portion of a solution of gum is now added and mixed in. The fulminate in a dampened state is then weighed out and added to the above mixture, and the whole, after being thoroughly mixed, is then used in the ordinary manner of such priming mixtures.

I also find that I may use other heavy metal oxids such as lead peroxid in place of the barium dioxid and I may substitute the silicids of barium or of strontium for that of calcium. Such substitutions, in whole or in part, fall within the scope of my invention.

I claim:

1. A non-corrosive priming mixture, comprising as its chief oxygen-supplying element, a metallic dioxid; as its principal fuel element, a metallic silicid; and as its detonating element, a metallic fulminate.

2. A non-corrosive priming mixture, comprising as its principal active constituents, heavy metal dioxid, alkaline earth silicid and mercury fulminate.

3. A non-corrosive priming mixture, comprising as its pricipal active constituents, barium dioxid, calcium silicid and mercury fulminate.

4. A non-corrosive priming mixture, comprising 25% to 45% of barium dioxid, 10% to 25% calcium silicid, 30% to 45% of mercury fulminate, and up to 25% of ground glass.

In testimony whereof I affix my signature.

JOSEPH D. McNUTT.